(12) United States Patent
Chu

(10) Patent No.: US 6,532,112 B2
(45) Date of Patent: Mar. 11, 2003

(54) ANTI-REFLECTION CONDUCTING COATING

(75) Inventor: Jau-Jier Chu, Hsinchu (TW)

(73) Assignee: Applied Vacuum Coating Technologies Co., Ltd., Hsinchu (TW)

( * ) Notice: Subject to any disclaimer, the term of this patent is extended or adjusted under 35 U.S.C. 154(b) by 0 days.

(21) Appl. No.: 09/836,510

(22) Filed: Apr. 18, 2001

(65) Prior Publication Data

US 2002/0181109 A1 Dec. 5, 2002

(51) Int. Cl.$^7$ ................................................ G02B 1/10
(52) U.S. Cl. ...................... 359/585; 359/580; 359/588
(58) Field of Search ........................ 359/586, 585, 359/580, 581, 582, 588

(56) References Cited

U.S. PATENT DOCUMENTS 4,599,272 A * 7/1986 Ichikawa ............... 204/192.36
5,508,091 A * 4/1996 Austin .......................... 359/359
5,556,694 A * 9/1996 Austin .......................... 359/582
5,579,162 A * 11/1996 Bjornard et al. ....... 204/192.26

* cited by examiner

Primary Examiner—Cassandra Spyrou
Assistant Examiner—Arnel C. Lavarias
(74) Attorney, Agent, or Firm—Rosenberg, Klein & Lee

(57) ABSTRACT

An anti-reflection layer system is composed of 5 layers of oxide materials and the materials of the outermost layer has a high-refractive index between 1.9 to 2.1. The materials of outermost layer are a kind of transparent conductive coating such as $SnO_2$, $ZnO_2$, $In_2O_3$ and ITO. Because of the surface layer has a good electrical conductive property, the layer system reduce much of work of grounding process and also increase the total yield in the volume production. The present invention provided a surface conductive layer structure of anti-reflection coating, which can be applied not only on display industry but also on touch sensor industry for glass and plastic substrate.

3 Claims, 2 Drawing Sheets

ANTI-REFLECTION CONDUCTING COATING

FIELD OF THE INVENTION

The present invention is related to an anti-reflection conducting coating, for plastic and/or glass substrate, whereby the layer system has a high anti-reflection effect. More specifically the invention related to a layer structure, which contains a high refractive index oxide material as outermost layer and has a photopic reflectance below 0.5%.

BACKGROUND OF THE INVENTION

U.S. Pat. No. 4,921,760, whose disclosure is an multi-layer anti-reflection coating with excellent adhesion between $CeO_2$ layer and synthetic resin. The layer system including $CeO_2$, $Al_2O_3$, $ZrO_2$, $SiO_2$, $TiO_2$ and $Ta_2O_5$. All the thin films of the layer system are oxide materials. There are 3 to 5 thin layers in the layer system. For a given example, the total thickness of the 5 layer structure was about 3580 Angstroms. The material of the outermost thin layer of the layer system is $SiO_2$ which has a low-refractive index about 1.46 at 550 nm.

U.S. Pat. No. 5,105,310, whose disclosure is a multi-layer anti-reflection coating designed for deposition in in-line coating maching by reactive sputtering. The layer system including $TiO_2$, $SiO_2$, ZnO, $ZrO_2$ and $Ta_2O_5$. All the thin films of the layer system are oxide material. There are 4 to 6 thin layers in the layer system. For a given example, the total thickness of the 6-layer structure was about 4700 Angstroms. The material of the outermost thin layer of the layer system is $SiO_2$, which has a low-refractive index about 1.46 at 550 nm.

U.S. Pat. No. 5,091,244 and 5,407,733 disclosed a new type electric conductive light-attenuating anti-reflection coating. The major claim is an article comprising of nitrides of certain transition metal to provided an electrically-conductive, light-attenuating, anti-reflection surfaces. The layer systems including TiN, NbN, $SnO_2$, $SiO_2$, $Al_2O_3$, and $Nb_2O_5$. The thin films of the layer system are nitride and oxide materials. There are 3 to 4 thin layers in the layer system. For a given example, the total thickness of the 4 layer structure was about 1610 Angstroms. The transmission of visible light of these two layer systems is below 50%. The material of the outermost thin layer of the layer system is $SiO_2$ which has a low-refractive index about 1.46 at 550 nm.

U.S. Pat. No. 5,147,125, whose disclosure is a multi-layer, anti-reflection coating using zinc oxide to provide UV rejection for wave-lengths shorter than 380 nm. The layer system including $TiO_2$, $SiO_2$, ZnO, and $MgF_2$. All the thin films of the layer system are oxide and floride. There are 4 to 6 thin layers in the layer system. For a given example, the total thickness of the 5 layer structure was about. 7350 Angstroms. The material of the outermost thin layer of the layer system is $MgF_2$ which has a low-refractive index about 1.38 at 550 nm.

U.S. Pat. 5,170,291 disclose a 4 layer system which is optical effective and has a high anti-reflective effect. The layers can be formed by either a pyrolytic method, a plasma-supported chemical vapor deposition method, a sputtering method or a chemical deposition method. The layer system including $SiO_2$, $TiO_2$, $Al_2O_3$, ZnS, MgO and $Bi_2O_3$. For a given sample, the total thickness of the 4 layer structure was about 2480 Angstroms. The material of the outermost thin layer of the layer system is $SiO_2$ which has a low-refractive index about 1.46 at 550 nm.

U.S. Pat. No. 5,216,542 whose disclosure is a 5 layer coating with high anti-reflection effect. The process use an adhesive layer of Ni, Cr or NiCr metal with a thickness about 1 nm (manometer). Other four layers are compose of $SnO_2$, $ZrO_2$, ZnO, $Ta_2O_5$, NiO, $CrO_2$, $TiO_2$, $Sb_2O_3$, $In_2O_3$, $Al_2O_3$, $SiO_2$, TiN and ZrN. For a given example, the total thickness of the 5 layer structure was about 2337 Angstroms. The transmission of visible light of this layer system is below 30%. The material of the outermost thin layer of the layer system is $SiO_2$ which has a low-refractive index about 1.46 at 550 nm.

U.S. Pat. No. 5,541,770 whose disclosure is a light attenuating anti-reflection coating including electrically conductive layers. It is a four or five layer system. A light absorption high refractive index metal such as Cr, Mo and W was used as a optically effective thin film in the layer system. The other three or four layers are $TiO_2$, ITO, $Al_2O_3$, $SiO_2$ and TiN. The patent shows that the majority materials of the layer system are oxide and nitride, only one metal film was used as an optical effective thin film in the anti-reflection coating. For a given example, the total thickness of the 5 layer structure was about 1495 Angstroms. The transmission of visible light of this layer system is below 60%. The material of the outermost thin layer of the layer system is $SiO_2$ which has a low-refractive index about 1.46 at 550 nm.

U.S. Pat. No. 5,362,552 whose disclosure is a 6-layer anti-reflection coating includes three layers of electrically-conductive metal oxide. The layer system including $SiO_2$, ITO, $Nb_2O_5$, and $Ta_2O_5$. Up to a total optical thickness of about one-wavelength of visible light of the electrically conductive metal oxide may be included in the coating. For one of given example of 6 layer structure, the materials and thickness of the majory two layers within this 6 layer system are $SiO_2$, 854 Angstroms and ITO 1975 Angstroms. Anyway, The material of the outermost thin layer of the layer system is $SiO_2$ which has a low-refractive index about 1.46 at 550 nm.

U.S. Pat. No. 5,579,162 whose disclose is a 4-layer anti-reflection coating for a temperature sensitive substrate such as plastic. One layer is a DC reactively sputtered metal oxide which may be deposited quickly and without imparting a large amount of heat to the substrate. The layer system including $SnO_2$, $SiO_2$ and ITO. For one of given example of the 4 layer structure, the materials and thickness of the majority two layers within this system are $SnO_2$, 763 Angstroms and $SiO_2$ 940 Angstroms. The material of the outermost thin layer of the layer system is $SiO_2$ which has a low-refractive index about 1.46 at 550 nm.

U.S. Pat. No. 5,728,456 and 5,783,049, disclosed An improved may to deposit anti-reflection coating on plastic film. The multi-layer thin films was coated by a roller coating with sputtering process. The layer system including ITO, $SiO_2$ and a thin lubricating over layer which is a solvent-soluble fluoropolymer. For a given example, the total thickness of the 6 layer system was about 2630 Angstrom. The material of the outermost thin layer of the layer system is $SiO_2$ which has a low-refractive index about 1.46 at 550 nm.

The above description show clearly that the material of outermost thin layer of the optical layer system is $SiO_2$ or $MgF_2$, which has a low refractive index of 1.46 and 1.38 at 550 mm, respectively.

SUMMARY OF THE INVENTION

An object of the present invention is to provide an anti-reflection coating layer system composed of 5 oxide layer and more specifically the material of outermost layer has a high refractive index between 1.9 to 2.1.

The process of manufacturing oxide thin film in volume production was high reliable and was routinely used in the industries such as semiconductor, disc head, LCD, CRT, architecture glass, touch sensor, screen filter and plastic web coating for a several ten years.

It is well known that conventional layer structure for an anti-reflection optical coating has a general principle. The basic principle is that the outermost layer of the optical coating is a material of low refractive index such as $SiO_2$ with refractive index of 1.46 or $MgF_2$ with refractive index 1.38. However, when we applied the anti-reflection coating on the display industry for example screen filter for computer monitor, or low reflection glass for flat CRT, there are some bottle neck in the process of high volume mass production. The basic reason is in the convention optical layer structure the conductive layer was buried by an insulating layer for example $SiO_2$ or $MgF_2$.

In the general design rule of an anti-reflection coating. The first layer deposited on a substrate surface is a material with high refractive index (namely H), and follow by a second layer which is a material of low refractive index (namely L). The basic design rule for the conventional anti-reflection coating has a layer structure such as HLHL or HL HL HL. In a simple case if the materials of H is ITO and the materials of L is $SiO_2$, the 4 layer structure is Glass/ITO/$SiO_2$/ITO/$SiO_2$. Because of ITO is a transparent conductive material, the multi-layer coating of this layer structure has electrical conductivity below 1000 $\Omega/\square$, and can be used as EMI shielding and/or electric static discharge when conductive coating layer was bonded to ground. However, trouble phenomena are the outermost material of the convention layer structure is $SiO_2$ and the typical thickness of $SiO_2$ layer is about 1000 Å. The material characteristic of $SiO_2$ is high density, inert property in chemical and is a very good insulating layer for electric. In the process of application of conventional anti-reflection coating on the display industry, it is hard work to make a electrical contact with the buried ITO layer which was isolated by outermost $SiO_2$ layer. For a typical grounding process to make a metal contact with ITO layer, it needs a ultra-sonic welding procedure to break the insulating layer ($SiO_2$) and to make sure good contact of tin solder with the buried ITO conductive layer. This process is a bottleneck for the application of anti-reflection coating in high volume.

On the other hand, the ultra-sonic welding process will produce small and bright contamination from tin spot because of the liquid tin, and explosive energy of ultra-sonic. This process also produces non-consist contact resistance for each bus bar line. It is because of the ultrasonic-welding process can not guarantee to break the insulating coating at the same depth evenly and to get a uniform contact resistance with ITO layer.

The drawbacks mention above will reduce the yield of the manufacturing process for the application of conventional anti-reflection coating. Therefore, It is quiet important to have an anti-reflection coating by using ITO conductive film as a material of outermost layer. However, it is unusual in the design principle of optical layer structure. The present invention is to provide an anti-reflection layer system compose of 5 layers of oxide materials and the materials of the outermost layer has a high-refractive index between 1.9 to 2.1. The materials of outermost layer are a kind of transparent conductive coating such as $SnO_2$, $ZnO_2$, $In_2O_3$ and ITO. Because of the surface layer has a good electrical conductive property, the layer system reduce much of work of grounding process and also increase the total yield in the volume production. The present invention provided a surface conductive layer structure of anti-reflection coating, which can be applied not only on display industry but also on touch sensor industry for glass and plastic substrate.

There are five layers, namely, the first, second, third, fourth, and fifth layers in consecutive numerical order beginning with the layer furthest from the substrate for the present invention of anti-reflection coating. The each layer was described in terms of physical thickness or optical thickness. The optical thickness is a mathematical product of a layers thickness and its refractive index. It is described as a fraction of a designed wavelength. In the present invention the designed wavelength is about 520 nm.

The first or the outermost layer is a transparent conductive oxide material. The oxide layer, preferably ITO substantially slightly absorption for visible light, has a refractive index between 1.9 to 2.1 at a wavelength of about 520 nanometer (nm) and a physical thickness between 10 nm to 40 nm at the design wavelength.

The second layer is an oxide material. The oxide layer preferably $SiO_2$, substantially non-absorption for visible light, has a refractive index between 1.45 to 1.50, at a wavelength of about 520 nm and a physical thickness between 20 to 60 nm at the design wavelength.

The third layer is a oxide material. The oxide layer, preferably NbO, substantially non-absorption for visible light, has a refractive index between 2.1 to 2.3 at a wavelength of about 520 nanometer (nm) and an physical thickness between 40nm to 90 nm at the design wavelength.

The fourth layer is an oxide material. The oxide layer, preferably $SiO_2$, substantially non-absorption for visible light, has a refractive index between 1.45 to 1.50 at a wavelength of about 520 nanometer (nm) and a physical thickness of between 20 nm to 60 nm at the design wavelength.

The fifth or the innermost layer is an oxide material. The oxide layer; preferably NbO substantially non-absorption for visible light, has a refractive index between 2.0 and 2.3 at a wavelength of about 520 nm and a physical thickness between 10 to 40 nm at the design wavelength.

In the preferred embodiment, the five layers coating include a first layer of ITO having a thickness about 25 nm. A second layer of $SiO_2$ having a thickness about 40 nm. A third layer of NbO having a thickness about 60 nm. A fourth layer of $SiO_2$ having a thickness about 26 nm, and a fifth layer is a layer of NbO having a thickness about 18 nm.

The stated objects are achieved by the invention, a conductive front surface with a resistance between $10^2$ $\Omega$/square~$10^3$ $\Omega$/square can be obtained from the ITO coating, and a smooth wide band reflection spectrum can be obtained on the glass or plastic substrate in the visible range from 400 nm to 700 nm. It is easy demonstrated that the process is simple, reliable, easy control and economically. It has become possible in this way to produce an anti-reflection coating with a good surface conductivity. Of particulate advantage, an in-line sputtering system was suggest to deposit the layer system of the present invention for low cost and high volume manufacturing.

On the other hand, the layer system of this invention is of high conductive for EMI (Electromagnetic Interference) shielding, high transparent for touch sensing, low reflection for optical view, high scratch resistance for surface hardness, and low cost for manufacturing. For instance, the layer system has a surface resistance between $10^2$ $\Omega$/square to $10^3$ Ω/square and is hard enough to pass the scratch test of military standard MIL-C-48497.

Thereby, a DC or AC magnetron sputtering can be provided to deposit the first layer from a ITO target in the presence of a sputter gas of Ar and a very small partial pressure of $O_2$, under a given total pressure of approximately 3 m Torr (m=mili=0.001), For the second and fourth layers, it is proposed that by using AC magnetron sputter from the silicon target, a layer of $SiO_2$ is generated in the presence of a sputter gas mixture comprising Ar and $O_2$, under a given pressure of 2 m Torr. For the third and fifth layers, it is proposed that via AC or pulse DC reactive sputtering from the Nb target, a layer of $Nb_2O_5$ is generated in the presence of a sputter gas mixture comprising Ar and $O_2$, under a given pressure of approximately 2.5 m Torr.

The following advantages are achieved with the invention. The problem of transparent conductive ITO layer, which was isolated by an insulating SiO2 film in a conventional anti-reflection layer system, is solved. The present invention provided a five-layer system in which the outermost material is ITO and has a refractive index between 1.9 and 2.1.

Because of the surface layer of the anti-reflection coating is electrical conductive, several simple process can be applied to make a good electrical contact with the anti-reflection coating easily. An example is to use this layer system in a touch sensor.

The conventional grounding method by using ultra-sonic welding process that produces small and bright contamination of tin spot will be replaced. The process of final assembling of anti-reflection coating on screen filter or flat CRT will be simplified. The problem of formation non-uniform electric contact between the isolated conductive ITO layer and tin solder will be solved. The yield of the grounding process will increase. On the other hand, the layer structure also can be used as a basic coating of industry of touch sensor.

Accordingly, the present invention having a five layers system composed of a electrical conductive materials as a outermost layer which is a simple easy, economic process for the anti-reflection coating on glass and particular on plastic substrate.

DESCRIPTION OF THE PREFERRED EMBODIMENTS

The present invention related to an oxide based anti-reflection coating with 5 layers. The multiplayer structure are numbered in sequence beginning from the outermost layer i.e. the layer furthest from a substrate surface on which the thin films is deposited. Layers thickness values are specified as either a physical thickness in nm or as an optical thickness as some fraction or multiple of a wavelength of visible light. The typical value is 520 nm.

Figure 1:
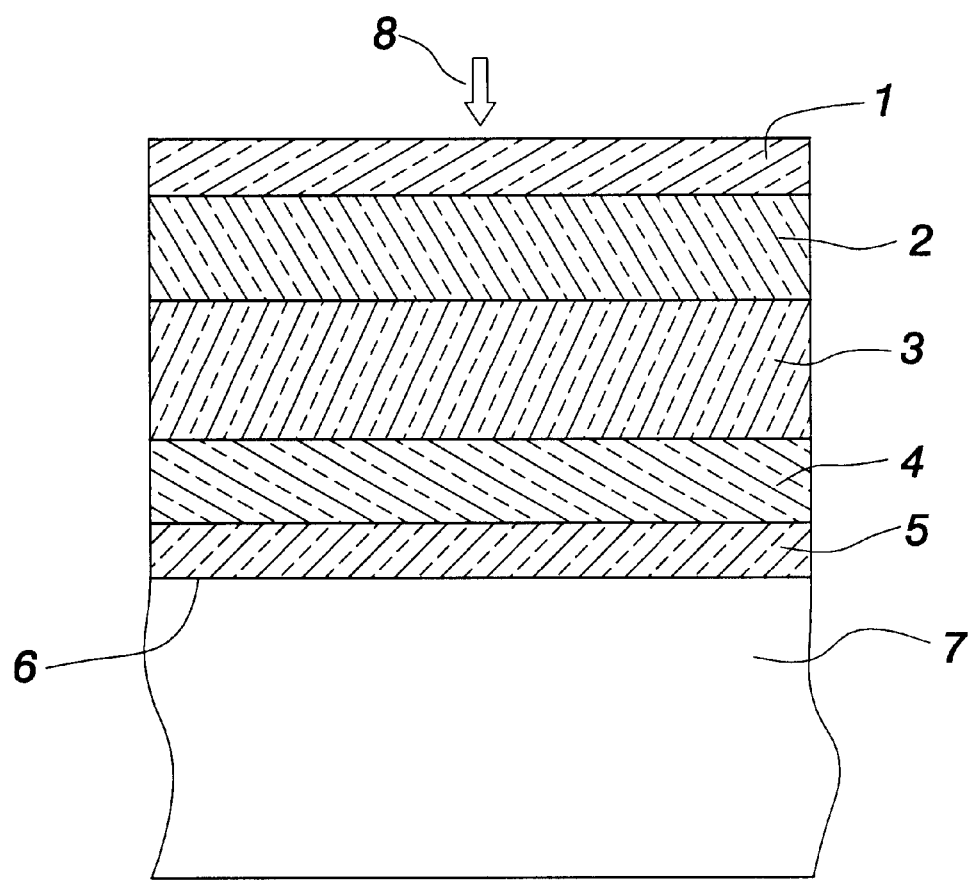
FIG. 1. Schematically shows a cross sectional view of a layer system according to the present invention.

The layer structure of a preferred embodiment of the present invention is shown in FIG. 1. A substrate 7 can be composed of glass, a plastic foil or another see-through materials. A front surface of substrate, namely side 6, is that side of substrate facing the observer. The direction of viewing is indicated by arrow 8. A layer 5, which is contacting the front side 6 of the substrate 7, is called a fifth layer 5. In the direction to the observer follows the fourth layer 4 being arranged on the fourth layer 5, which is next to the front surface of the substrate. The third layer 3 of the five layers being arranges on the forth layer 4. The second layer 2 being arranged on the third layer 3. The first layer or the outermost layer 1 being arranged on the second layer 2. The layers 1, 2, 3, 4 and 5 form a layer system of the present invention.

The first layer, or the outermost layer 1 is ITO layer with a thickness of 25 nm. The ITO has a refraction index of about 1.9~2.1 at a wavelength of about 520 nm. The second layer 2 of the layer system is a $SiO_2$ layer of a thickness about 40 nm. The second layer has a refractive index of about 1.46 at a wavelength of about 520 nm. The third layer is an NbO layer of a thickness of 60 nm. The NbO layer has a refractive index of about 2.2 at a wavelength of about 520 nm. The forth layer 4 of the layer system is a $SiO_2$ layer of a thickness about 25 nm. The forth layer has a refractive index of about 1.46 at a wavelength of about 520 nm. The fifth layer, or innermost layer 5 of the layer system is a NbO layer of a thickness about 18 nm. The fifth layer has a refractive index of about 2.2 at a wavelength of about 520 nm.

Figure 2:
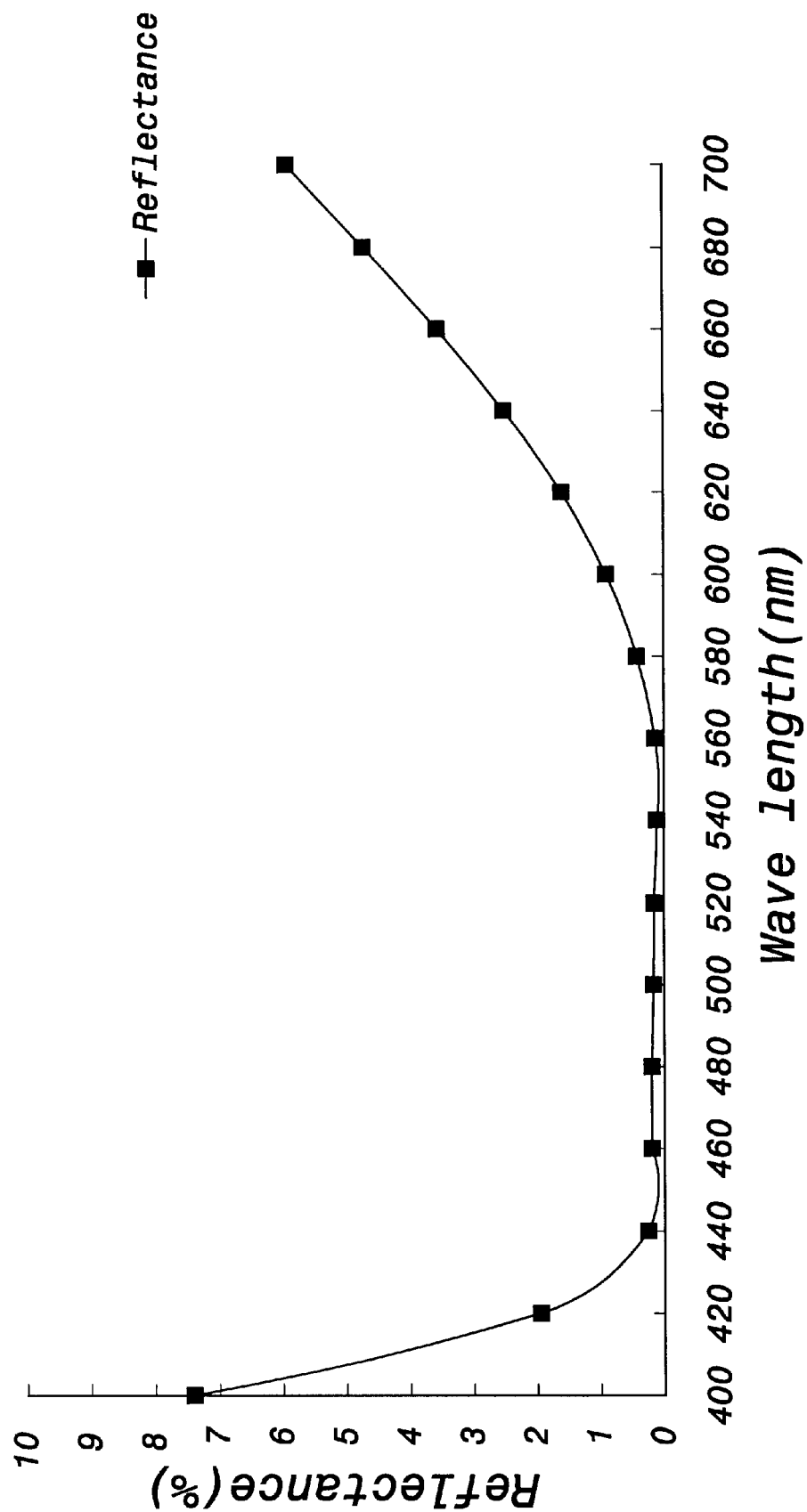
FIG. 2. Shows the measured reflection curve in percent versus wavelength in nm of a layer system according to the present invention.

FIG. 2. Shows the real reflection spectrum for the layer system. The reflection was measured in percent at the front surface of the glass. The visible spectrum extends from a wavelength of 400 nm to a wavelength of 700 nm. The curve reveals clearly that the reflection in the core wavelength region of the visible light particularly between 440 and 570 nm is extra ordinarily low. It lie below 0.3%. This result was as good as the reflection spectrum measured from the layer system composed of the basic design of HLHL oxide materials.

Table 1. shows the detail data of reflection spectrum ranging from 400 nm to 700 nm. The sputtering of oxide layer 2, 3, 4 and 5 were performed with a magnetron cathode by using a AC sputter method in a reactive gas atmosphere composed of a gas mixture of Ar and $O_2$. On the other hand, for first layer, namely ITO, the sputtering was performed with a magnetron cathode by using a DC or pulse DC sputter method in a reactive gas atmosphere composed of a gas mixture of Ar and very slightly amount of $O_2$. The target material for layer 5, 4, 3, 2 and 1 were Nb, Si, Nb, Si and ITO respectively. The target to substrate distance was about 15 cm. A heating device was applied in sputtering system. The substrate temperature was kept at 150 to 300° C. during sputtering process.

TABLE 1

| Wavelength (nm) | Reflection (percent) |
| --- | --- |
| 400 | 7.40 |
| 420 | 1.96 |
| 440 | 0.27 |
| 460 | 0.18 |
| 480 | 0.16 |
| 500 | 0.15 |
| 520 | 0.14 |
| 540 | 0.10 |
| 560 | 0.11 |
| 580 | 0.41 |
| 600 | 0.90 |
| 620 | 1.60 |
| 640 | 2.50 |
| 660 | 3.54 |
| 680 | 4.68 |
| 700 | 5.90 |

The working pressure during sputtering was described as following:

Sputtering for the layer 5: 2.5 m Torr
Sputtering for the layer 4: 2 m Torr
Sputtering for the layer 3: 2.5 m Torr
Sputtering for the layer 2: 2 m Torr
Sputtering for the layer 1: 3 m Torr Moreover, the surface layer of the anti-reflection coating is electrical conductive, several simple process can be applied to make a good electrical contact with the anti-reflection coating easily.

Although various minor modification may be suggested by those versed in the art, it should be understood that we wish to embody within the scope of the patent granted hereon all such modifications as reasonably and properly come within the scope of our contribution to the art.

I claim:

1. An anti-reflection conducting coating comprising five layers designated the first, second, third, fourth, and fifth layers in consecutive order beginning with the layer farthest from a substrate;

said first layer comprising a first material selected from a group consisting of ITO, $SnO_2$, and ZnO, said first material having a refractive index ranging between 1.9 and 2.1 at a wavelength of 520 nm and a physical thickness of 10–40 nm;

said second layer disposed under said first layer comprising a second material being $SiO_2$, said second material having a refractive index between 1.45 to 1.5 at a wavelength of 520 nm and a physical thickness of 20–60 nm;

said third layer disposed under said second layer comprising a third material selected from a group consisting of TiO, NbO, and $Ta_2O_5$, said third material having a refractive index between 2.1 to 2.3 at a wavelength of 520 nm and a physical thickness of 40–90 nm;

said fourth layer disposed under said third layer comprising a fourth material being $SiO_2$, said fourth material having a refractive index between 1.45 to 1.5 at a wavelength of 520 nm and a physical thickness of 20–60 nm;

said fifth layer sandwiched between said fourth layer and said substrate comprising a fifth material selected from a group consisting of TaO, NbO, and TiO, said fifth material having a refractive index between 2.0 to 2.3 at a wavelength of 520 nm and a physical thickness of 10–40 nm.

2. The anti-reflection conductive coating of claim 1, wherein said substrate is a plastic.

3. The anti-reflection conductive coating of claim 1, wherein said substrate is a glass.

* * * * *